(12) United States Patent
Voit et al.

(10) Patent No.: US 7,643,409 B2
(45) Date of Patent: Jan. 5, 2010

(54) COMPUTER NETWORK WITH POINT-TO-POINT PSEUDOWIRE REDUNDANCY

(75) Inventors: Eric Voit, Bethesda, MD (US); Steve Phillips, San Jose, CA (US); Ali Sajassi, Concord, CA (US); Yves Hertoghs, Schilde (BE)

(73) Assignee: Cisco Technology, Inc., San Jose, CA (US)

( * ) Notice: Subject to any disclaimer, the term of this patent is extended or adjusted under 35 U.S.C. 154(b) by 947 days.

(21) Appl. No.: 10/925,743

(22) Filed: Aug. 25, 2004

(65) Prior Publication Data

US 2006/0047851 A1    Mar. 2, 2006

(51) Int. Cl.
*G01R 31/08* (2006.01)
*G06F 15/173* (2006.01)

(52) U.S. Cl. .............................. 370/218; 709/239
(58) Field of Classification Search ................ None
See application file for complete search history.

(56) References Cited

U.S. PATENT DOCUMENTS

| | | | |
|---|---|---|---|
| 5,818,842 A | 10/1998 | Burwell et al. | |
| 5,848,277 A | 12/1998 | Sheu et al. | |
| 6,055,364 A | 4/2000 | Speakman et al. | |
| 6,073,176 A | 6/2000 | Baindur et al. | |
| 6,078,590 A | 6/2000 | Farinacci et al. | |

(Continued)

FOREIGN PATENT DOCUMENTS

WO    WO 2007/031002 A    3/2007
WO    WO 2008/089370      7/2008

OTHER PUBLICATIONS

Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

(Continued)

*Primary Examiner*—Gregory B Sefcheck
(74) *Attorney, Agent, or Firm*—The Law Offices of Bradley J. Bereznak

(57) ABSTRACT

A computer network includes a core network connected with first and second Ethernet access domain networks, each of Ethernet access domain networks including a user-facing provider edge (u-PE) device, a primary network-facing provider edge (n-PE) device, a redundant n-PE device, and a plurality of aggregation provider edge (Agg-PE) devices providing connectivity between to the u-PE device and the primary and redundant n-PE devices, the Agg-PE devices running a spanning-tree protocol (STP) algorithm. A primary data path is provided along with first and second redundant data paths that include first and second redundant pseudowires (PWs), respectively, connected across the core network, the first and second redundant data paths being blocked by the STP algorithm when the primary data path is available, the STP algorithm unblocking either the first or second redundant data path in response to a failure of the primary data path. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

12 Claims, 13 Drawing Sheets

U.S. PATENT DOCUMENTS

| | | | |
|---|---|---|---|
| 6,301,244 B1 | 10/2001 | Huang et al. |
| 6,308,282 B1 | 10/2001 | Huang |
| 6,373,838 B1 | 4/2002 | Law et al. |
| 6,424,657 B1 | 7/2002 | Voit et al. |
| 6,430,621 B1 | 8/2002 | Srikanth et al. |
| 6,484,209 B1 | 11/2002 | Momirov |
| 6,502,140 B1 | 12/2002 | Boivie |
| 6,611,869 B1 | 8/2003 | Eschelbeck et al. |
| 6,667,982 B2 | 12/2003 | Christie et al. |
| 6,668,282 B1 | 12/2003 | Booth, III et al. |
| 6,732,189 B1 | 5/2004 | Novaes |
| 6,757,286 B1 | 6/2004 | Stone |
| 6,763,469 B1 | 7/2004 | Daniely |
| 6,785,232 B1 | 8/2004 | Kotser et al. |
| 6,785,265 B2 | 8/2004 | White et al. |
| 6,789,121 B2 | 9/2004 | Lamberton et al. |
| 6,798,775 B1 | 9/2004 | Bordonaro |
| 6,801,533 B1 | 10/2004 | Barkley |
| 6,813,268 B1 | 11/2004 | Kalkunte et al. |
| 6,826,698 B1 | 11/2004 | Minkin et al. |
| 6,829,252 B1 | 12/2004 | Lewin et al. |
| 6,839,348 B2 | 1/2005 | Tang et al. |
| 6,850,521 B1 | 2/2005 | Kadambi et al. |
| 6,850,542 B2 | 2/2005 | Tzeng |
| 6,852,542 B2 | 2/2005 | Mandel et al. |
| 6,882,643 B1 | 4/2005 | Mauger et al. |
| 6,892,309 B2 | 5/2005 | Richmond et al. |
| 6,954,436 B1 | 10/2005 | Yip |
| 7,009,983 B2 | 3/2006 | Mancour |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 | 10/2007 | Frietsch |
| 7,310,342 B2 | 12/2007 | Rouleau |
| 7,343,423 B2 * | 3/2008 | Goguen et al. ............. 709/239 |
| 7,345,991 B1 * | 3/2008 | Shabtay et al. ............. 370/221 |
| 7,408,936 B2 | 8/2008 | Ge et al. |
| 7,466,703 B1 | 12/2008 | Arunachalam et al. |
| 2002/0032780 A1 | 3/2002 | Moore et al. |
| 2002/0087721 A1 | 7/2002 | Sato et al. |
| 2002/0196795 A1 | 12/2002 | Higashiyama |
| 2003/0012183 A1 | 1/2003 | Butler |
| 2003/0036375 A1 | 2/2003 | Chen et al. |
| 2003/0101243 A1 | 5/2003 | Donahue et al. |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0154259 A1 | 8/2003 | Lamberton et al. |
| 2003/0177221 A1 | 9/2003 | Ould-Brahim et al. |
| 2004/0095940 A1 | 5/2004 | Yuan et al. |
| 2004/0102182 A1 | 5/2004 | Reith et al. |
| 2004/0125809 A1 | 7/2004 | Jeng |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0172559 A1 | 9/2004 | Luo et al. |
| 2004/0228291 A1 | 11/2004 | Huslak et al. |
| 2004/0233891 A1 * | 11/2004 | Regan et al. ............. 370/351 |
| 2004/0264364 A1 | 12/2004 | Sato |
| 2005/0007951 A1 | 1/2005 | Lapuh et al. |
| 2005/0025143 A1 | 2/2005 | Chen et al. |
| 2005/0030975 A1 | 2/2005 | Wright et al. |
| 2005/0044262 A1 * | 2/2005 | Luo ............................. 709/238 |
| 2005/0044265 A1 | 2/2005 | Vinel et al. |
| 2005/0063397 A1 | 3/2005 | Wu et al. |
| 2005/0097219 A1 * | 5/2005 | Goguen et al. ............. 709/238 |
| 2005/0099949 A1 | 5/2005 | Mohan et al. |
| 2005/0152370 A1 | 7/2005 | Meehan et al. |
| 2005/0157664 A1 | 7/2005 | Baum |
| 2005/0157751 A1 | 7/2005 | Rabie et al. |
| 2005/0163049 A1 | 7/2005 | Yazaki et al. |
| 2005/0175022 A1 | 8/2005 | Nishimura et al. |
| 2005/0190773 A1 | 9/2005 | Yang et al. |
| 2005/0220014 A1 * | 10/2005 | DelRegno et al. ........... 370/230 |
| 2005/0249124 A1 | 11/2005 | Elie-Dit-Cosaque et al. |
| 2005/0286503 A1 | 12/2005 | Oda et al. |
| 2006/0092847 A1 | 5/2006 | Mohan et al. |
| 2006/0098607 A1 | 5/2006 | Zeng |
| 2006/0182037 A1 | 8/2006 | Chen et al. |
| 2006/0248277 A1 | 11/2006 | Pande |
| 2006/0285500 A1 | 12/2006 | Booth |
| 2006/0285501 A1 | 12/2006 | Damm |
| 2007/0008982 A1 * | 1/2007 | Voit et al. ................... 370/401 |

OTHER PUBLICATIONS

Light Reading, Inc., Distributed-Edge Artecture, Nov. 25, 2003.
Landron, Use of the IEEE Assigned Type Field with IEEE std 802.3, 1998 Edition Local and Metropolian Area Networks, Apr. 16, 2004.
Marc Lasserre et al., "Virtual Private LAN Services over MPLS", Mar. 2003, Internet Draft Document, pp. 4-22.
Pseudo-Wire Edge-To Edge (PWE3) Working Group, Simon Delord, Uecomm; Philippe Niger, France Telecom; Yuichi Ikejiri, Yuichiro Wada, NTT Debor: "PWE3 Applications & OAM Scenarios; draft-delord-pwe3-oam-applications 02.txt" Standard-Working-Draft, Internet Engineering Task Force, IETF, CH, No. 2, Oct. 1, 2005 XP015042128 ISSN: 0000-0004 abstract p. 10, paragraph 3 Section 3.1.1.1. on pp. 12-13; http://ftp.ist.utl.pt/pub/drafts/draft-delord-pwe3-oam-applications-02.txt.
Blunk et al. Draft RFC 2284—Extensible Authentication Protocol EAP, Feb. 2004; http://tools.ietf.org/html/draft-ietf-eap-rfc2284bis-09.

* cited by examiner

COMPUTER NETWORK WITH POINT-TO-POINT PSEUDOWIRE REDUNDANCY

RELATED APPLICATIONS

The present application is related to co-pending application Ser. No. 10/857,716 filed May 28, 2004, which application is assigned to the assignee of the present application.

FIELD OF THE INVENTION

The present invention relates generally to digital computer network technology; more particularly, to methods and apparatus for providing redundancy mechanisms for network connections.

BACKGROUND OF THE INVENTION

Many enterprises are changing their business processes using advanced information technology (IT) applications to achieve enhanced productivity and operational efficiencies. These advanced applications tend to place increasing importance on peer-to-peer data communications, as compared to traditional client-server data communications. As a result, the underlying network architecture to support these applications is evolving to better accommodate this new model.

The performance of many peer-to-peer applications benefit from being implemented over service provider networks that support multipoint network services. A multipoint network service is one that allows each customer edge (CE) end point or node to communicate directly and independently with all other CE nodes. Ethernet switched campus networks are an example of a multipoint service architecture. The multipoint network service contrasts with more traditional point-to-point services, such as hub-and-spoke network services, where the end customer designates one CE node to the hub that multiplexes multiple point-to-point services over a single User-Network Interface (UNI) to reach multiple "spoke" CE nodes. In a hub-and-spoke network architecture, each spoke can reach any other spoke only by communicating through the hub. Traditional network service offering to the end customers via wide area networks (WANs) such as Frame Relay (FR) and asynchronous transfer mode (ATM) networks are based on a hub-and-spoke service architecture.

Virtual Private Network (VPN) services provide secure network connections between different locations. A company, for example, can use a VPN to provide secure connections between geographically dispersed sites that need to access the corporate network. There are three types of VPN that are classified by the network layer used to establish the connection between the customer and provider network. Layer 1 VPNs are simple point-to-point protocol (PPP) connections such as leased lines, ISDN links, and dial-up connections. In a Layer 2 VPN (L2VPN) the provider delivers Layer 2 circuits to the customer (one for each site) and provides switching of the customer data. Customers map their Layer 2 routing to the circuit mesh, with customer routes being transparent to the provider. Many traditional L2VPNs are based on Frame Relay or ATM packet technologies. In a Layer 3 VPN (L3VPN) the provider router participates in the customer's Layer 3 routing. That is, the CE routers peer only with attached PEs, advertise their routes to the provider, and the provider router manages the VPN-specific routing tables, as well as distributing routes to remote sites. In a Layer 3 Internet Protocol (IP) VPN, customer sites are connected via IP routers that can communicate privately over a shared backbone as if they are using their own private network. Multi-protocol label switching (MPLS) Border Gateway Protocol (BGP) networks are one type of L3VPN solution. An example of an IP-based Virtual Private Network is disclosed in U.S. Pat. No. 6,693,878. U.S. Pat. No. 6,665,273 describes a MPLS system with a network device for traffic engineering.

An important aspect of VPN technologies is the ability of network devices to automatically discover and signal to other devices an association with a particular VPN, often referred to as discovery and signaling mechanisms.

Virtual Private LAN Service (VPLS) is an emerging technology that addresses the need for Layer 2 multipoint VPN that connects multiple sites within a specific metropolitan geographic area. VPLS is an architecture that delivers a Layer 2 multipoint VPN service that in all respects emulates an Ethernet LAN across a wide metropolitan geographic area. All services in a VPLS appear to be on the same LAN, regardless of location. In other words, with VPLS, customers can communicate as if they were connected via a private Ethernet segment, i.e., multipoint Ethernet LAN services. VPLS thus supports the connection of multiple sites in a single bridged domain over a managed IP/MPLS network.

FIG. 1 illustrates an example of a basic VPLS architecture with an IP or MPLS service provider network core. The customer sites (i.e., CE devices) are connected to the service provider network at a PE device. (The connection between a CE-PE pair of devices is commonly referred to as a UNI.) Each PE-CE pair is shown connected by an Attachment Circuit (AC). An AC is the customer connection to a service provider network; that is, the connection between a CE and its associated PE. An AC may be a point-to-point connection on a physical interface, a PPP session from an L2TP tunnel, an MPLS Label Switched Path (LSP), or a virtual port, and may be any transport technology, i.e., Frame Relay, ATM, a VLAN, etc. In the context of a VPLS, an AC is typically an Ethernet port, in which Ethernet serves as the framing technology between the CE device and the PE router. By way of example, frames can include IEEE 802.1Q Ethernet VLAN tags. CE devices can also be connected through several edge domains that are interconnected using an MPLS core network. Such edge domains can be built using Ethernet switches and techniques such as VLAN tag stacking (so-called "QinQ" encapsulation).

In the example of FIG. 1, each PE device includes a Virtual Switch Instance (VSI) that emulates an Ethernet bridge (i.e., switch) function in terms of MAC address learning and forwarding in order to facilitate the provision of a multipoint L2VPN. A pseudowire (PW) is shown connecting every two VSIs.

A PW is a virtual connection between two PE devices which connect two ACs. Conceptually in context of the VPLS service, a PW can be thought of as point-to-point virtual link for each offered service between a pair of VSIs. Therefore, if each VSI can be thought of as a virtual Ethernet switch for a given customer service instance, then each PW can be thought of as a virtual link connecting these virtual switches over a Packet Switched Network (PSN) to each other for that service instance. During setup of a PW, the two connecting PE devices exchange information about the service to be emulated in order to be able to properly process packets received from the other end in the future.

Another type of provider provisioned VPN architecture that uses PWs is the Virtual Private Wire Service (VPWS). VPWS is a Layer 2 service that provides point-to-point connectivity (e.g., Frame Relay, ATM, point-to-point Ethernet) and can be used to create port-based or VLAN-based Ethernet private lines across a MPLS-enabled IP network. Conceptually, in the context of the VPWS service, a PW can be thought of as a point-to-point virtual link connecting two customer ACs. After a PW is setup between a pair of PEs, frames received by one PE from an AC are encapsulated and sent over the PW to the remote PE, where native frames are reconstructed and forwarded to the other CE. All PEs in the SP network are connected together with a set of tunnels, with each tunnel carrying multiple PWs. Depending on the number of customer sites and the topology for connecting these sites, the number of PWs setup for a given customer can range from two, for a customer with only two sites, to many PWs for a customer who has locations connected to every PE.

Similar to Ethernet switches, VPLS-capable PE devices are capable of dynamically learning the Media Access Control (MAC) addresses (on both physical ports and virtual circuits) of the frame packets they replicate and forward across both physical ports and PWs. That is, each PE device is capable of learning remote MAC addresses-to-PW associations and also learns directly attached MAC addresses on customer facing ports. To achieve this result, PE devices maintain a Forwarding Information Base (FIB) table for each VPN and forward frames based on MAC address associations. Another attribute of an Ethernet network is that frames with unknown destination MAC addresses are flooded to all ports.

For an Ethernet network to function properly, only one available path can exist between any two nodes. To provide path redundancy and prevent undesirable loops in the network topology caused by multiple available paths, Ethernet networks typically employ Spanning Tree Protocol (STP), or some variant of STP, e.g., MSTP or RSTP. (For purposes of the present application, STP and its variants are generically denoted by the acronym "xSTP".) Switches in a network running STP gather information about other switches in the network through an exchange of data messages called Bridge Protocol Data Units (BPDUs). BPDUs contain information about the transmitting switch and its ports, including its switch and port Media Access Control (MAC) addresses and priorities. The exchange of BPDU messages results in the election of a root bridge on the network, and computation of the best path from each switch to the root switch. To provide path redundancy, STP defines a tree from the root that spans all of the switches in the network, with certain redundant paths being forced into a standby (i.e., blocked) state. If a particular network segment becomes unreachable the STP algorithm reconfigures the tree topology and re-establishes the link by activating an appropriate standby path. Examples of networks that run STP are disclosed in U.S. Pat. Nos. 6,519,231, 6,188,694 and 6,304,575.

A redundancy mechanism for Virtual Private LAN Service with Ethernet access network is described in Section 11.2 of the Internet Engineering Task Force (IETF) document draft-ietf-l2vpn-vpls-ldp-01.txt. The redundancy mechanism described in that draft leverages the use of xSTP on the Ethernet bridges in the access network as well on the PEs to provide a failure recovery mechanism for link and node failures. According to this approach, each network-facing PE (n-PE) runs xSTP such that each BPDU packet is terminated by the receiving n-PE and the information in the BPDU packet is processed by the n-PE. The n-PE then originates a new BPDU packet using the newly processed information. The main drawback of this mechanism is that it requires every node in the Ethernet access network, including n-PE devices, to execute the spanning-tree protocol.

Moreover, although the approach described in Section 11.2 of the above IETF document can be used to solve the functional problem of redundant pseudowires for point-to-point links, it requires VPLS capable platforms on both sides of the core network "cloud". Additionally, it also requires the use of a Virtual Forwarding Instance on a platform, which can reduce total end-to-end scalability in certain deployments. Because of these drawbacks, it is problematic to have two Ethernet PWs (on redundant core MPLS PE devices) backing up a single point-to-point connection in an Ethernet over MPLS (EoMPLS) deployment.

Thus, there is an unsatisfied need for alternative network architectures and topologies capable of capable of delivering point-to-point pseudowire redundancy for EoMPLS networks without requiring multipoint VPLS technology facing the MPLS core.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Figure 1:
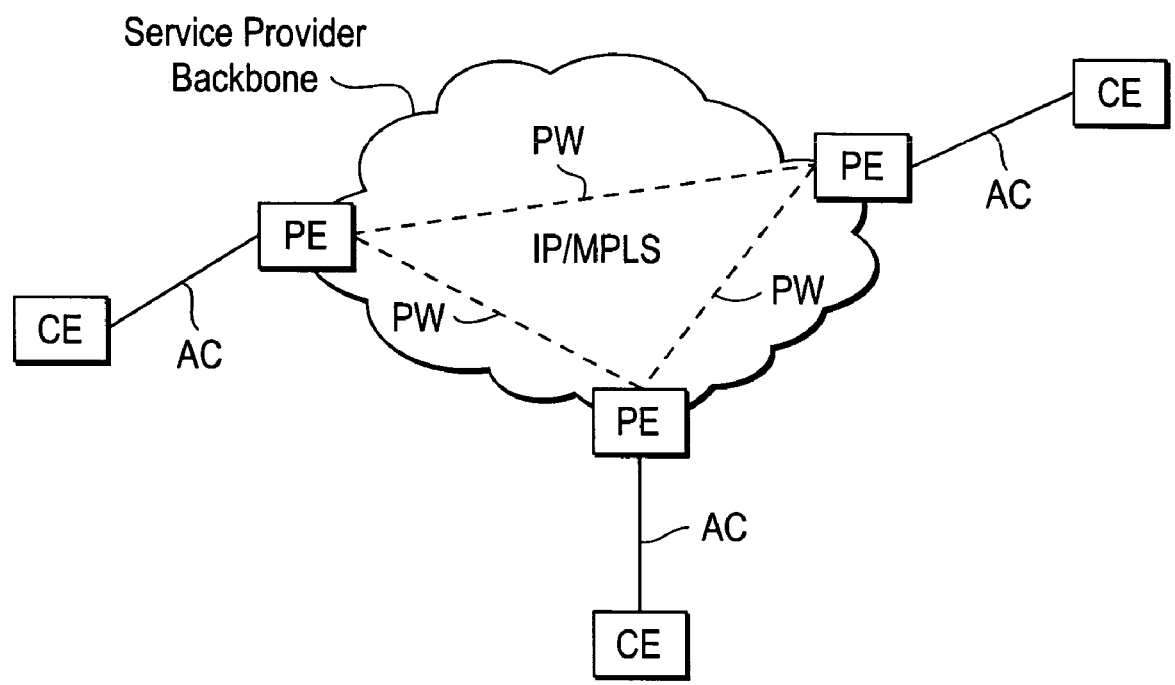
FIG. 1 is an example of a prior art VPLS system.

A computer network that provides redundant EoMPLS point-to-point pseudowires without causing loops or UNI to UNI frame replication is described. In the following description specific details are set forth, such as device types, protocols, configurations, etc., in order to provide a thorough understanding of the present invention. However, persons having ordinary skill in the networking arts will appreciate that these specific details may not be needed to practice the present invention. Practitioners in the network arts will further appreciate that the architecture of the present invention is useful for Ethernet Wire Service (EWS) applications, which emulate point-to-point Ethernet segments, as well as Ethernet Relay Service (ERS) applications, which use VLAN tags to multiplex several non-same-destination pseudowires to a single port.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Each node typically comprises a number of basic subsystems including a processor, a main memory and an input/output (I/O) subsystem. Data is transferred between the main memory ("system memory") and processor subsystem over a memory bus, and between the processor and I/O subsystems over a system bus. Examples of the system bus may include the conventional lightning data transport (or hyper transport) bus and the conventional peripheral component [computer] interconnect (PCI) bus. The processor subsystem may comprise a single-chip processor and system controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

Figure 2:
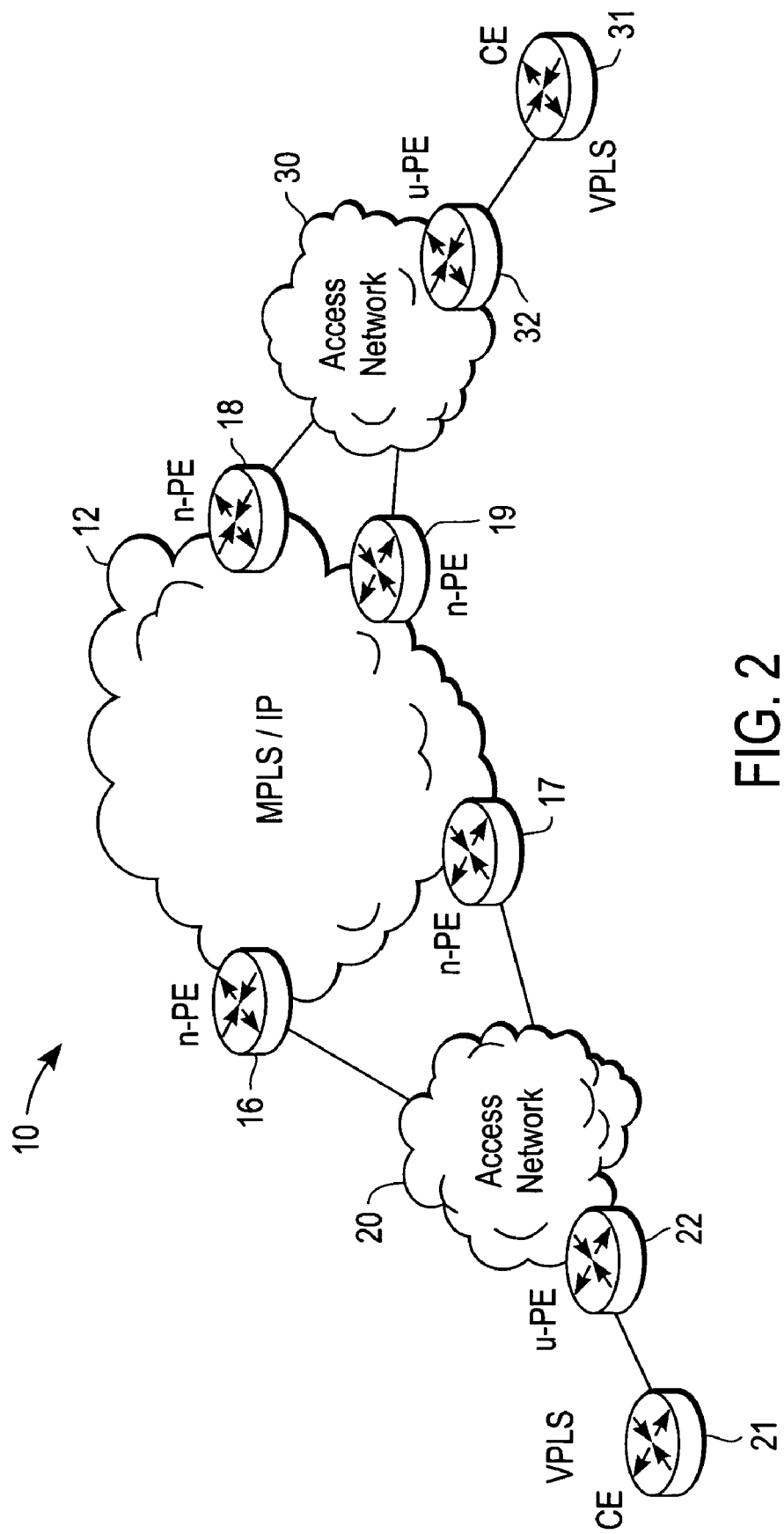
FIG. 2 illustrates an exemplary VPLS system with a MPLS/IP core network and separate access network domains in accordance with one embodiment of the present invention.

With reference now to FIG. 2, there is shown an exemplary system 10 providing VPLS service to a customer having two sites/CEs in accordance with one embodiment of the present invention. A Service Provider (SP) core MPLS/IP network 12 is shown including four network-facing provider edge (n-PE) devices 16-19, which act as a gateway between the MPLS/IP core and edge domain. Each access network may connect with the core network through one PE device, with the other PE device providing redundancy in the event of a device or link failure (as described in more detail shortly). Although not explicitly shown in FIG. 2, MPLS/IP network 12 may include a plurality of ordinary provider (P) devices that act purely as label-switching devices that can swap an incoming label with an outgoing label at very high speed.

The edge domain in system 10 comprises a pair of access networks 20 and 30. Access network 20, for example, is an Ethernet access network that is shown connected to n-PE devices 16 and 17, whereas access network 30 is shown connected to n-PE devices 18 and 19 on the edge of MPLS/IP core 12. Devices 16 & 17 are typically edge routers capable of running a protocol to set up PW connections. Each of the access networks 20 & 30 includes respective user-facing provider edge (u-PE) devices 22 & 32, which are used to connect respective customer edge (CE) devices 21 & 31 to the service.

A full mesh of pseudowires (not shown for clarity reasons) is formed between Virtual Switch Instances (VSIs) associated with a given customer service instance in n-PEs 16-19. Each VSI functions like a logical Ethernet switch or bridge for a given customer service instance with PWs 13-15 providing a mechanism for packet forwarding between a pair of VSIs from one n-PE device to another n-PE device over the core network. Thus, the PWs are used for transport of customer data packet traffic across the MPLS/IP core, thereby interconnecting access networks 20 and 30.

It is appreciated that each individual PW has a set of unique attributes that are specific to that PW only. As the attributes are inherently point-to-point in nature, signaling of these attributes may be performed using a peer-to-peer protocol such as targeted Label Distribution Protocol (LDP).

Figure 3:
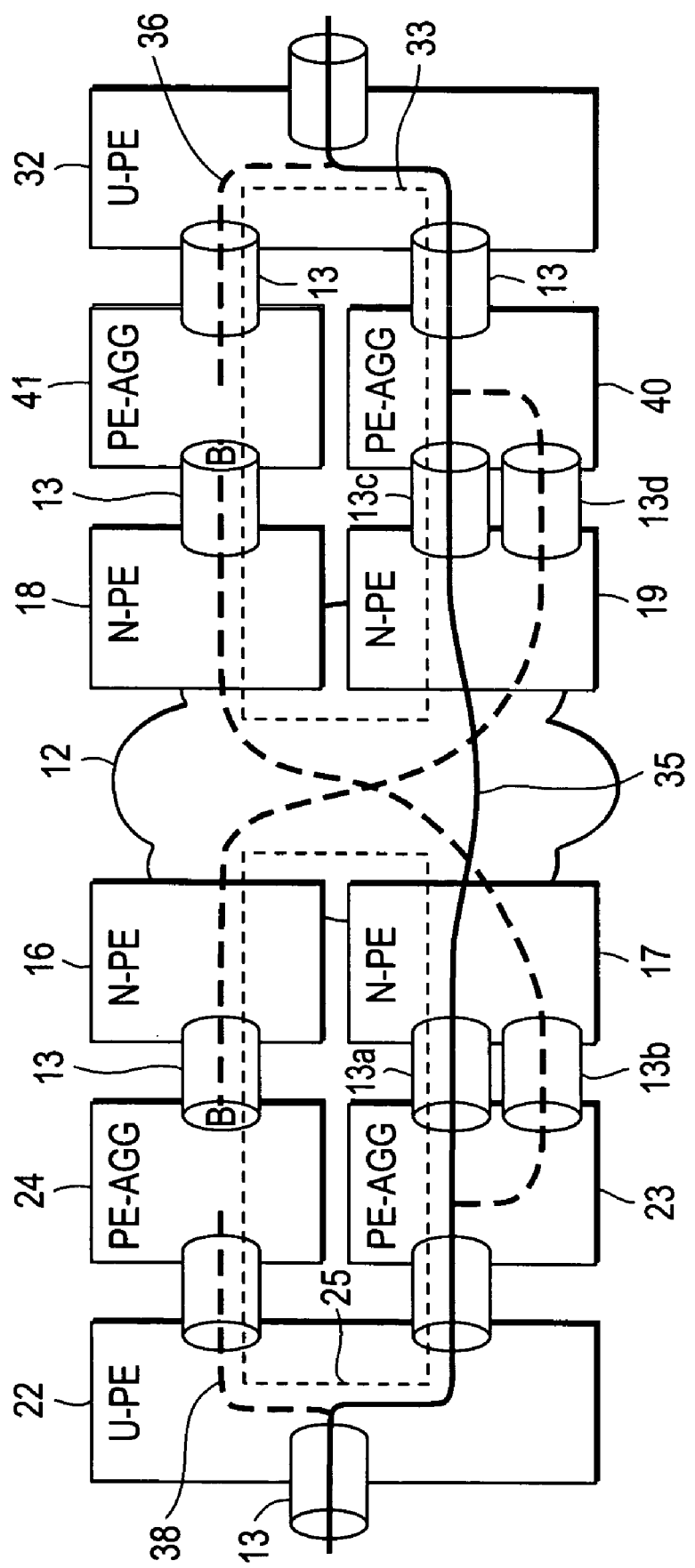
FIG. 3 is an example of network architecture with redundant pseudowires in accordance with one embodiment of the present invention.

FIG. 3 is a detailed block diagram of the system of FIG. 2 configured in accordance with one embodiment of the present invention. The two separate access domain networks are shown on opposite sides of core MPLS SP network 12. In this embodiment the left-hand side access network includes u-PE device 22, n-PE devices 16 & 17, and a pair of provider edge aggregation (Agg-PE or PE-Agg) devices 23 & 24. Each of Agg-PE devices 23 and 24 is an Ethernet switch or bridge that functions to aggregate one or more u-PE devices (e.g., device 22) for onward connection to one or more n-PE devices. (In the context of the present application, the terms "bridge" and "switch" are considered synonymous.) In FIG. 3, for example, Agg-PE devices 23 & 24 are shown connecting u-PE device 22 with n-PE devices 16 & 17.

It should be understood that although two Agg-PE devices are shown in FIG. 3, each of the access domains may comprise any number of such Agg-PE devices or redundant n-PE devices. Furthermore, While u-PE and Agg-PE are shown separately in the figures, it is appreciated that the u-PE and Agg-PE devices may be functionally integrated in the same physical unit or box.

Note that the connections between the various devices are shown as trunks 13 that provide a link between the PE devices. In one implementation, each of the access domains is a QinQ network, with the trunks operating in accordance with the IEEE 802.1Q network specification. The right-hand side access domain includes n-PE devices 18 & 19, Agg-PE devices 40 & 41, and u-PE device 32, each of which is connected via trunks 13 in similar manner to that described above for the left-hand side Ethernet access domain.

In the embodiment of FIG. 3, the u-PE devices 22 & 32 and Agg-PE devices 23-24 & 40-41 run one of many possible STP protocols (i.e., xSTP) so as to prevent loops within each access domain. In this embodiment, xSTP does not run on n-PE devices 16 & 17 or 18 & 19; rather, the STP messages are simply passed seamlessly through the n-PE devices. Spanning tree works by selecting a root bridge on the LAN. The root bridge can be though of the center of a web or the root of a tree topology. When the root bridge is selected the other switches then the other switches elect a port with the least path cost to use on the LAN. The root bridge on a LAN is selected by an election taking place. Each switch running STP passes information in a format called bridge protocol data units (BPDUs). In the embodiment of FIG. 3, BPDU paths 25 and 33 are shown for the left-hand side and right-hand side access domains, respectively. When the switch or bridge priorities combined with its MAC address are all exchanged the bridge with the highest ID is selected as the root bridge. It is selected by comparing each others MAC address and priority value. Ports on the root bridge are typically known as designated ports. Designated bridge ports that forward frames are selected after the bridge determines the lowest cost path to get to the root bridge. Forwarding state ports can send and receive data packet traffic. All of the other bridges present are known as non-route bridges. In a learning state, bridge ports learn MAC addresses but do not forward frames. In a listening state, bridge ports running xSTP listen to ensure that no loops occur in the network before passing frames.

On non-root bridges only one port is designated, all others are blocked. In FIG. 3, blocking is shown by the capital letter "B". In the blocking state, the bridge ports running xSTP listens, but does not forward frames. By using xSTP, redundant links are thus closed down. In FIG. 3, for example, the links between Agg-PE device 24 and n-PE device 16, and between Agg-PE device 41 and n-PE device 18, are shown closed. These links can be opened again if there is a change in network topology and the link is needed once more.

It should be understood that the n-PE devices associated with each access domain do not run spanning tree protocol, or any variant thereof. That is, in the embodiment of FIG. 3, n-PE devices 16-19 are routers, not switches, and do not incorporate bridging functionality. A dedicated PW (i.e., VPLS instance) may be established between the n-PE devices (i.e., between devices 16 & 17 and between devices 18 & 19) for the purpose of facilitating BPDU traffic.

With continuing reference to FIG. 3, a "live" (i.e., flooded and learned) data path 35 is shown providing connectivity between the two end points represented by u-PE devices 22 and 32. In other words, data path 35 provides a connection that allows data packet traffic to flow across each access domain and core network 12. Redundant paths (i.e., flooded and not learned) are shown by dashed lines 36 and 38 in FIG. 3.

According to the present invention, a network topology is provided with redundant pseudowire connections established for blocked data paths 36 and 38. In FIG. 3, a first redundant pseudowire provides connectivity across SP MPLS network 12 between n-PE devices 17 & 18. A second redundant pseudowire connection is provided between n-PE devices 16 & 19. Note that in this example, two trunks 13 provide separate links (one for path 36 and one for path 35) between Agg-PE device 23 and n-PE device 17. Similarly, two trunks 13 provide separate links (one for path 38 and one for path 35) between Agg-PE device 40 and n-PE device 19. In accordance with the present invention, multiple copies of replicated Ethernet frames crossing a redundant pseudowire are blocked by the spanning tree at the opposite end access domain. Thus, in the example of FIG. 3, spanning tree blocking is shown occurring between the upper n-PE and Agg-PE devices (i.e., between devices 16 & 24 and devices 18 & 41). In the event that one of the switches or links which connect to the primary pseudowire on the originating side fails (i.e., in data path 35) the spanning tree protocol running in that local Ethernet access domain automatically opens a backup data path (i.e., either path 36 or 38 in FIG. 3) to the redundant pseudowire, thereby bypassing the failed link or device.

By way of further example, assume that the left-hand side access domain in FIG. 3 is the originating side for frames and the link between Agg-PE device 23 and n-PE device 17 fails (i.e., trunk 13a shuts down). In this case, the spanning tree protocol running on the left-hand side access domain responds to the failure by opening up backup data path 38 through the redundant PW connection between n-PE devices 16 & 19, and through trunk 13d. Various exemplary failure scenarios for an alternative embodiment are described below in connection with FIGS. 7-13.

Persons of skill in the art will appreciate that the present invention solves the problem of redundancy while obviating the need for new functionality incorporated into switches. That is, networks configured in accordance with the present invention are ensured of having a viable data path between UNI (the connection between CE and u-PE devices) serving generic Ethernet switches (i.e., u-PE devices), even though redundant PW paths exist between redundant pairs of Ethernet switches. The solution offered by the present invention thus allows independent, redundant Ethernet over MPLS (EoMPLS) point-to-point pseudowires without causing loops or UNI to UNI frame replication. This means, for example, that EoMPLS connections can survive any link or node failure past the UNI serving Ethernet switch (e.g., past either u-PE device 22 or 32 in the embodiment of FIG. 3). Moreover, the present invention achieves this result without multipoint bridging on the n-PE devices at either end of the PW cloud, and without running spanning tree across the core network. provides for link/node failure recovery for an Ethernet access network of an L2VPN without the need to run xSTP protocols on the associated n-PE devices.

The solution of the present invention also relies on xSTP standards in existing switches. Ordinary practitioners in the networking arts will further appreciate that the present invention does not require snooping of BPDUs, nor utilization of potentially scarce VLAN/VPLS Virtual Forwarding Instance resources. Additionally, it should be understood that the redundancy mechanism of the present invention may be used in parallel with other service redundancy mechanisms for L3 services.

Figure 4:
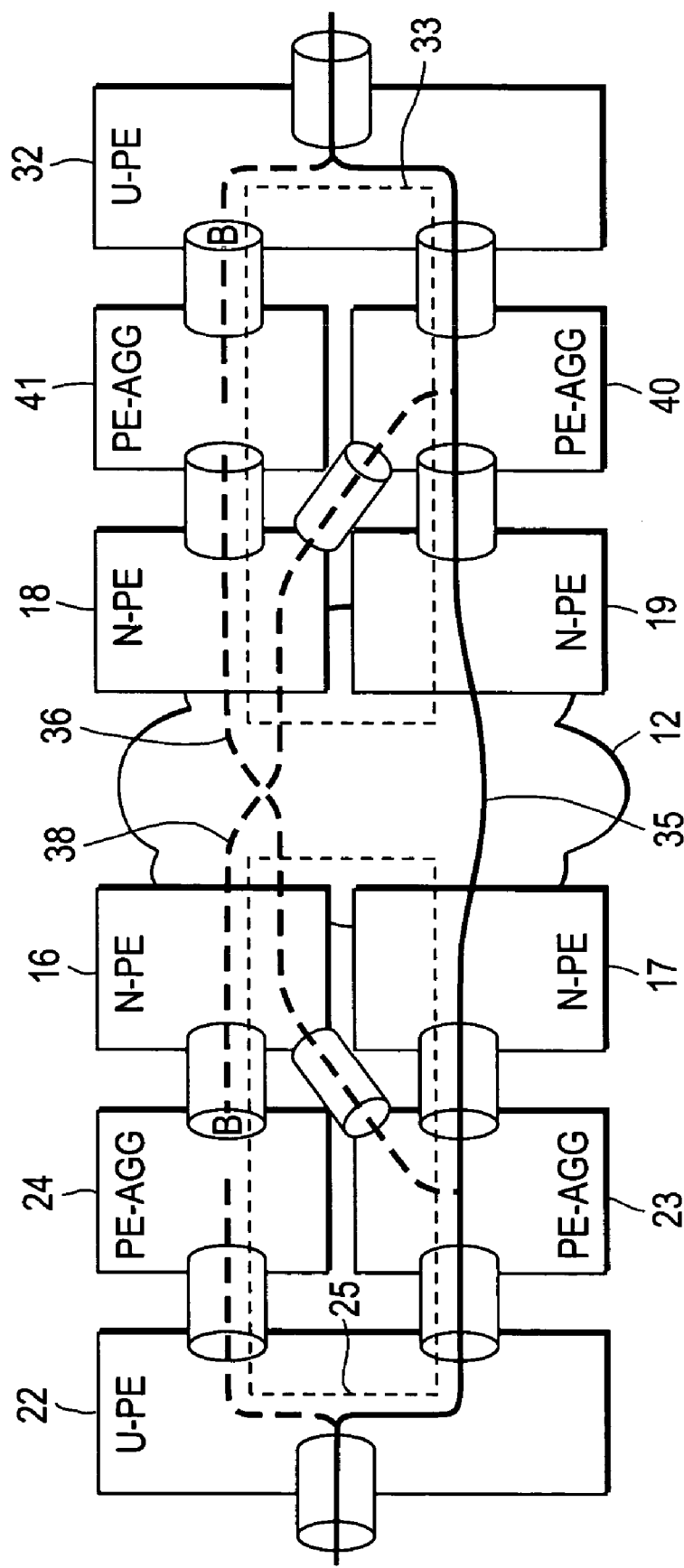
FIG. 4 illustrates an alternative embodiment of the present invention.

Turning now to FIG. 4, another implementation of the present invention is shown including a link between n-PE device 16 and Agg-PE device 23, and a link between n-PE device 18 and Agg-PE device 40. Redundant PWs for backup paths 36 & 38 are setup between redundant n-PE devices 16 and 18. In other words, redundant MPLS VPN aggregation goes to the same n-PE devices. It is appreciated that the embodiment of FIG. 4 obviates the need for two physical links to the same n-PE device (e.g., links 13a & 13b to n-PE device 17, as shown in FIG. 3).

Figure 7:
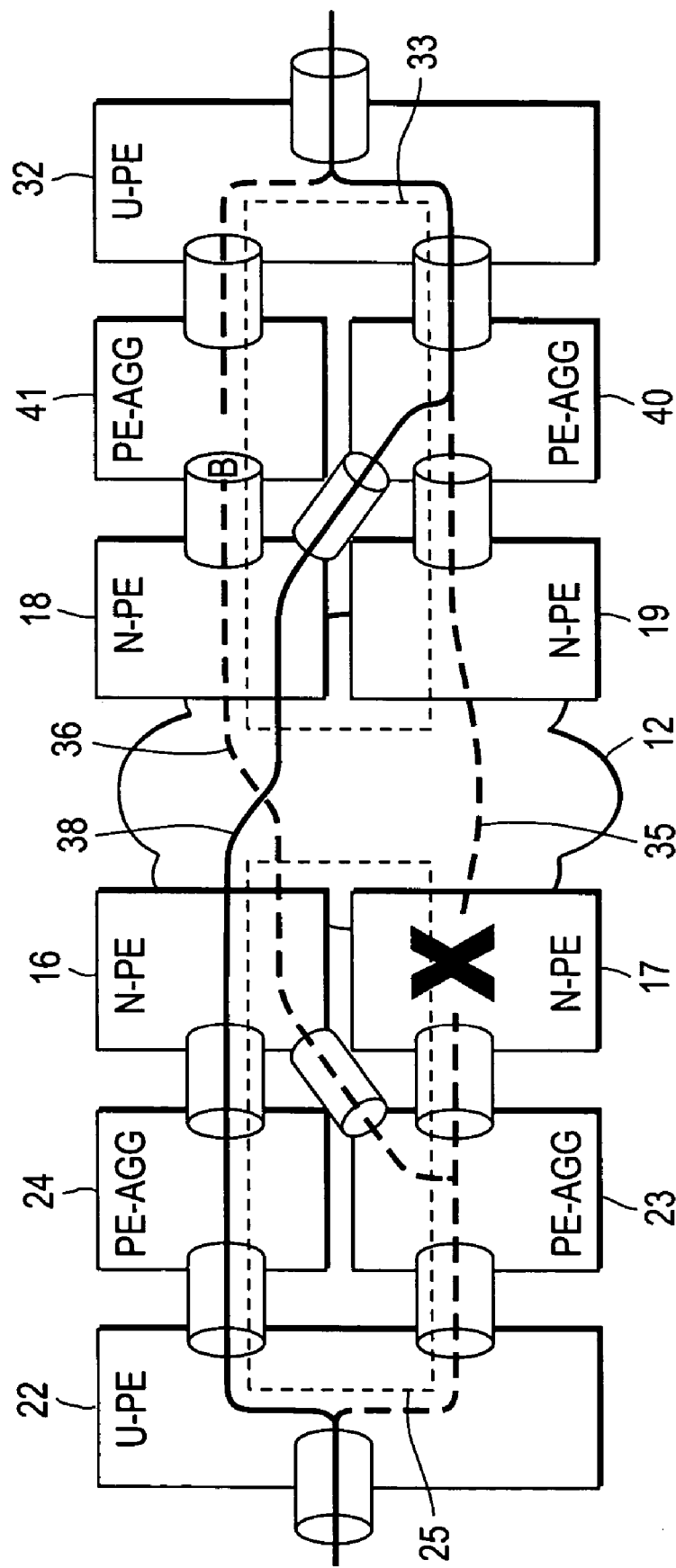
FIG. 7 illustrates redundancy according to one embodiment of the present invention in the case of a VLAN failure at a network-facing PE device.

FIG. 7 illustrates the redundancy mechanism provided by the embodiment of FIG. 4 in the event of a primary n-PE VLAN failure. (The failure is represented in FIG. 7 by a capital letter "X".) Because of the failure, the original live data path 35 is broken. Spanning tree running in the left-hand side access domain detects the failure and responds by activating backup data path 38, which includes the redundant PW connection between n-PE devices 16 & 18. As a result of the VLAN failure, data packets now pass through the link between n-PE device 18 and Agg-PE device 40.

Figure 8:
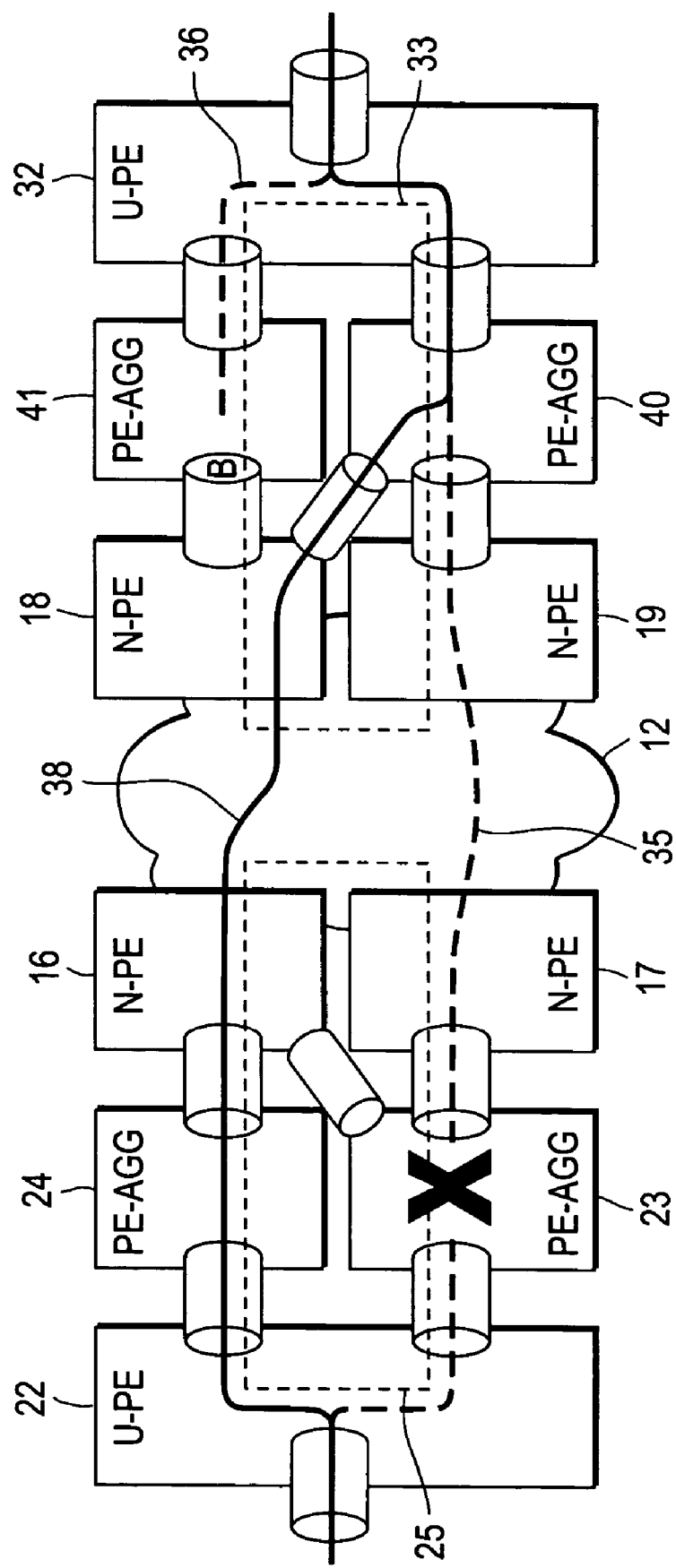
FIG. 8 illustrates redundancy according to one embodiment of the present invention in the case of a VLAN failure at a primary aggregate PE device.

FIG. 8 illustrates the redundancy mechanism provided by the embodiment of FIG. 4 in the event of Agg-PE failure. In this case, primary Agg-PE device 23 is shown failed, with backup data path 38 being activated through the PW connection between n-PE devices 16 & 18.

Figure 9:
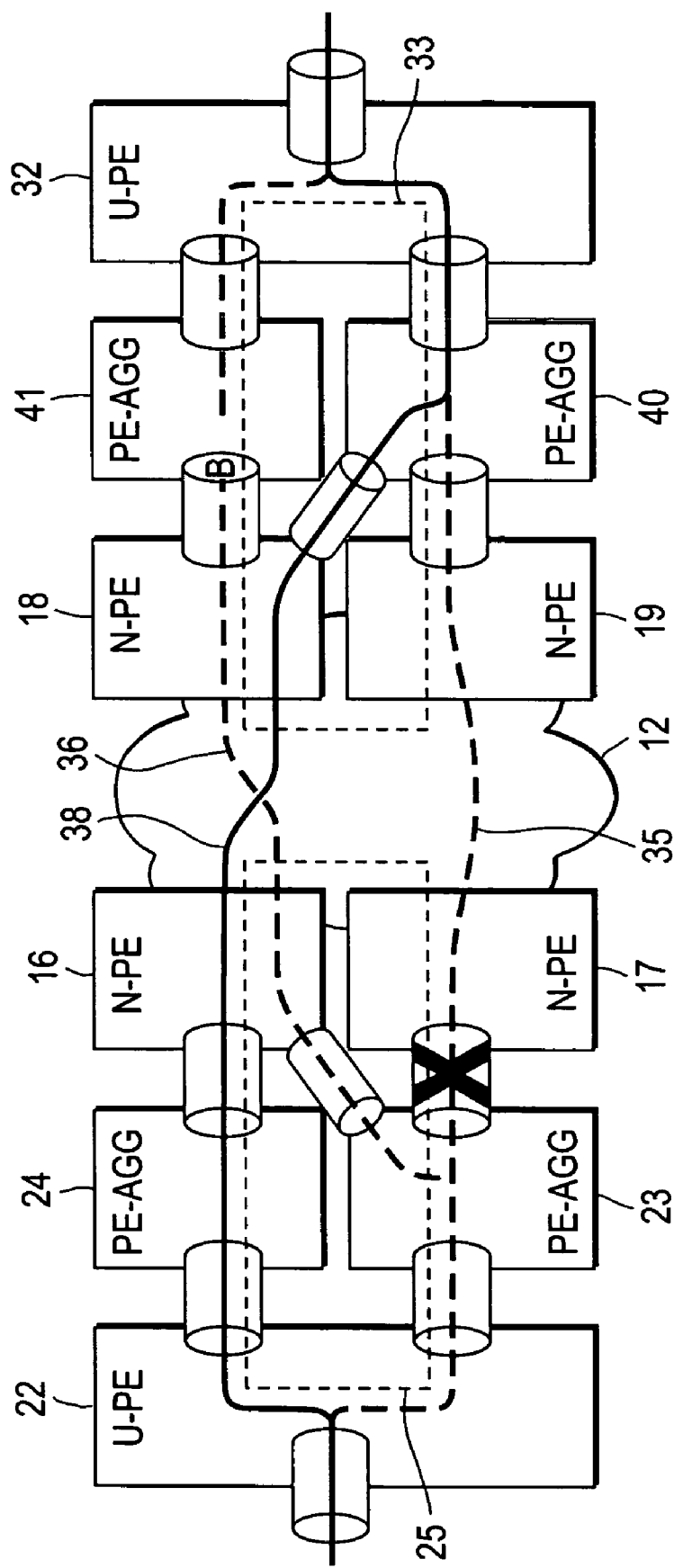
FIG. 9 illustrates redundancy according to one embodiment of the present invention in the case of a trunk failure.

FIG. 9 shows the redundancy mechanism of the present invention for the topology of FIG. 4 in the event of a trunk failure between Agg-PE device 23 and n-PE device 17. As in the previous examples of FIGS. 7 & 8, failure of a link in the primary data path 35 causes activation of the backup data path 38 through redundant Agg-PE device 24 and redundant n-PE device 16 in the left-hand side access domain. Backup data path 38 includes the redundant PW connection between n-PE devices 16 & 18, the link between n-PE device 16 and Agg-PE device 40, and between Agg-PE device 40 and u-PE device 32.

Figure 10:
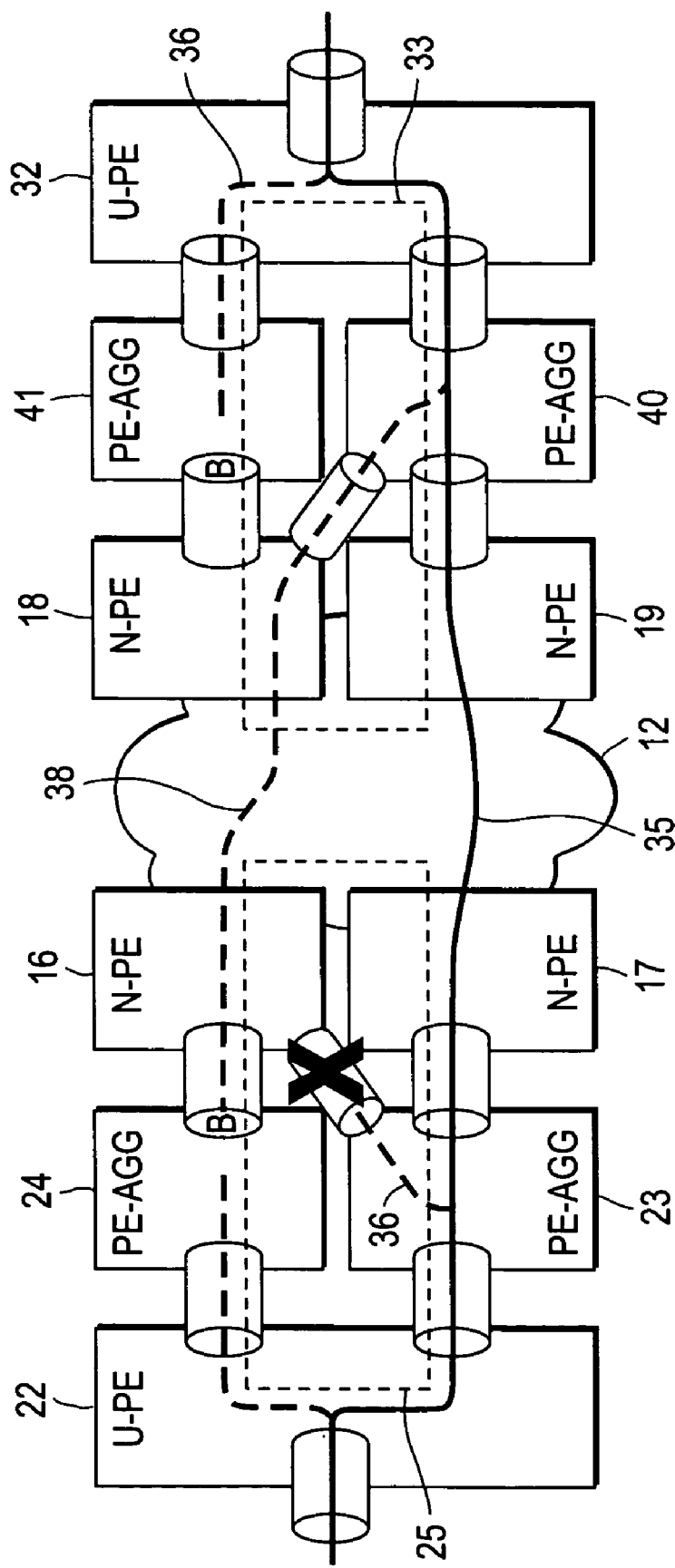
FIG. 10 illustrates redundancy according to one embodiment of the present invention in the case of another trunk failure.

FIG. 10 shows the redundancy mechanism of the present invention for the topology of FIG. 4 in the event of a trunk failure between Agg-PE device 23 and n-PE device 16. In this failure scenario the primary data path 35 is unaffected, so data packet traffic continues in the same manner as before the failure. The failure only affects the backup data path 36.

Figure 11:
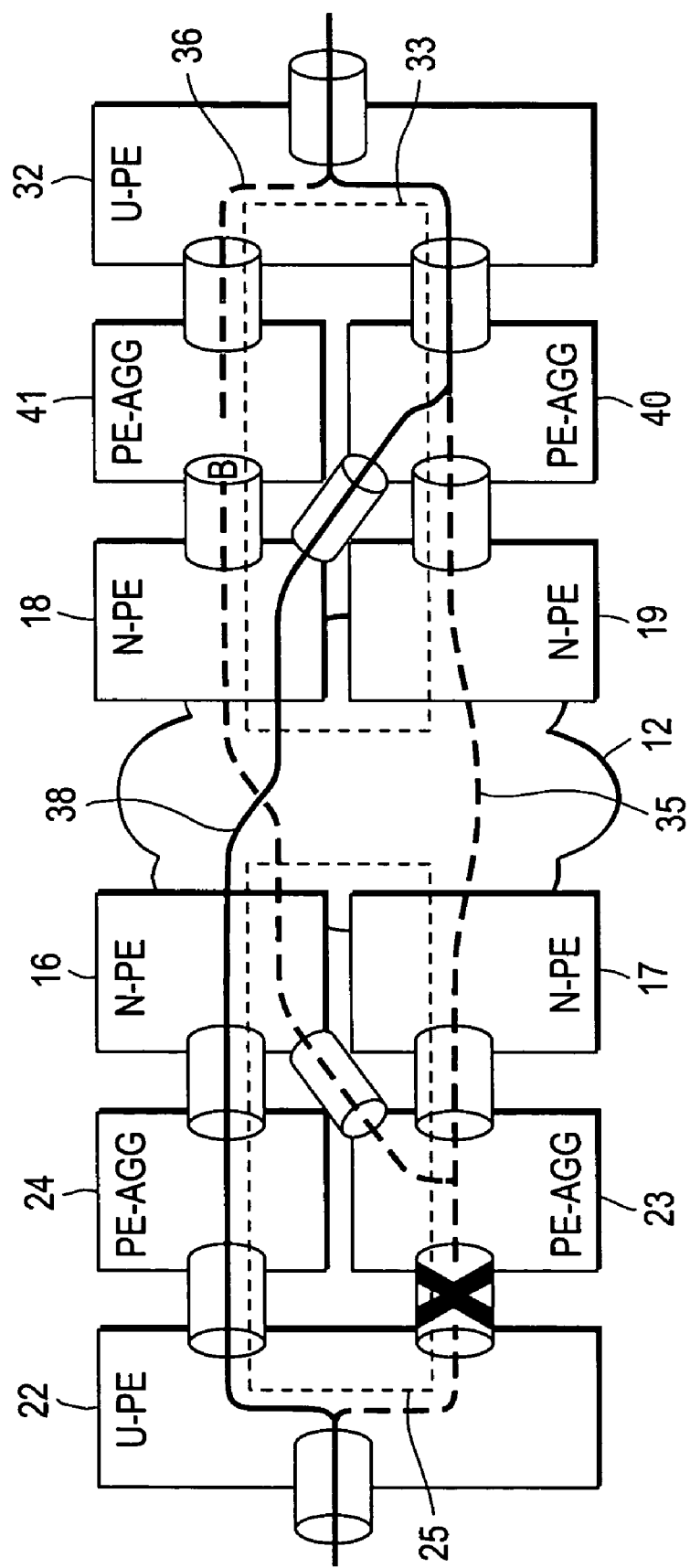
FIG. 11 illustrates redundancy according to one embodiment of the present invention in the case of still another trunk failure.

FIG. 11 shows the response of the network of FIG. 4 to a trunk failure of the link between u-PE device 22 and Agg-PE device 23, resulting in the failure of primary data path 35. In this case, the previously blocked path 38 is opened such that Ethernet frames are now forwarded from u-PE device 22, through Agg-PE device 24, n-PE device, across core network 12 (via a redundant PW connection to n-PE device 18), through n-PE device 18 and Agg-PE device 40 to u-PE device 32.

Figure 12:
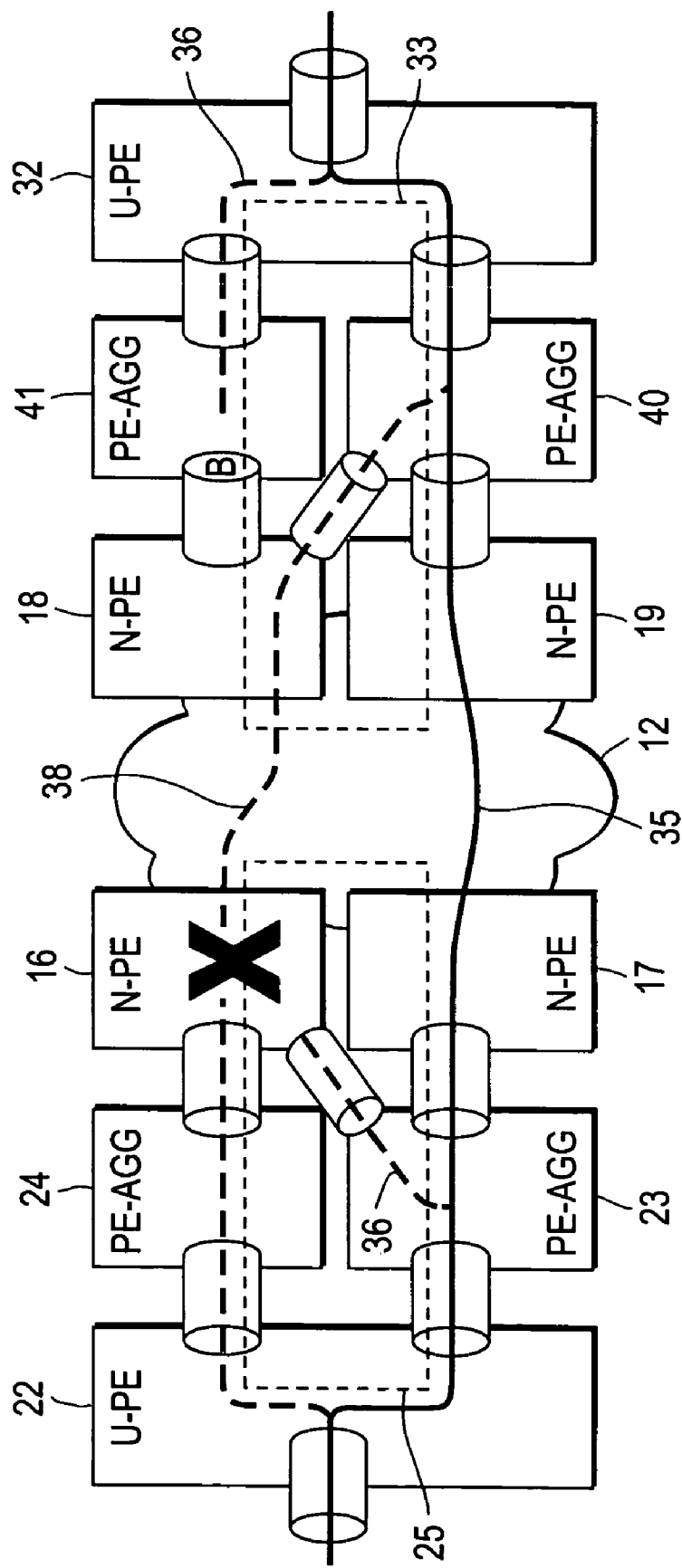
FIG. 12 illustrates redundancy according to one embodiment of the present invention in the case of a redundant network-facing PE device failure.

FIG. 12 illustrates the case of a failure occurring at redundant n-PE device 16. As was the case in the example of FIG. 10, this particular failure scenario does not affect the primary data path 35, so data packet traffic continues in the same manner as before the failure. The failure only affects the viability of backup data path 38.

Figure 13:
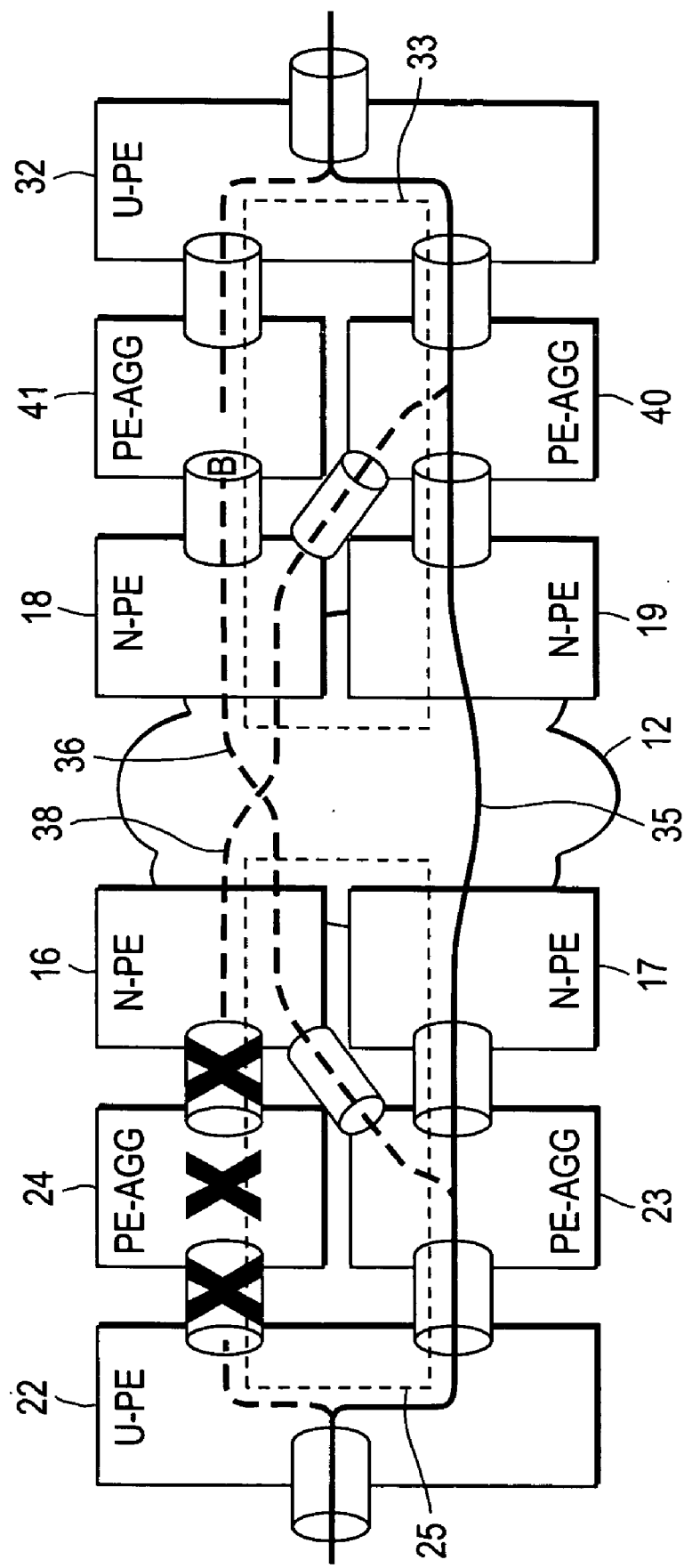
FIG. 13 illustrates redundancy according to one embodiment of the present invention in the case of a non-primary path failure.

Finally, FIG. 13 shows yet another possible failure scenario in which both the links to the Agg-PE device in the non-primary data path, as well as Agg-PE device 24, fail. Here again, since the failure has occurred in the redundant, or non-primary backup data path 38, data packet traffic continues to flow through the primary path 35 in the same manner as before the failure happened.

Figure 5:
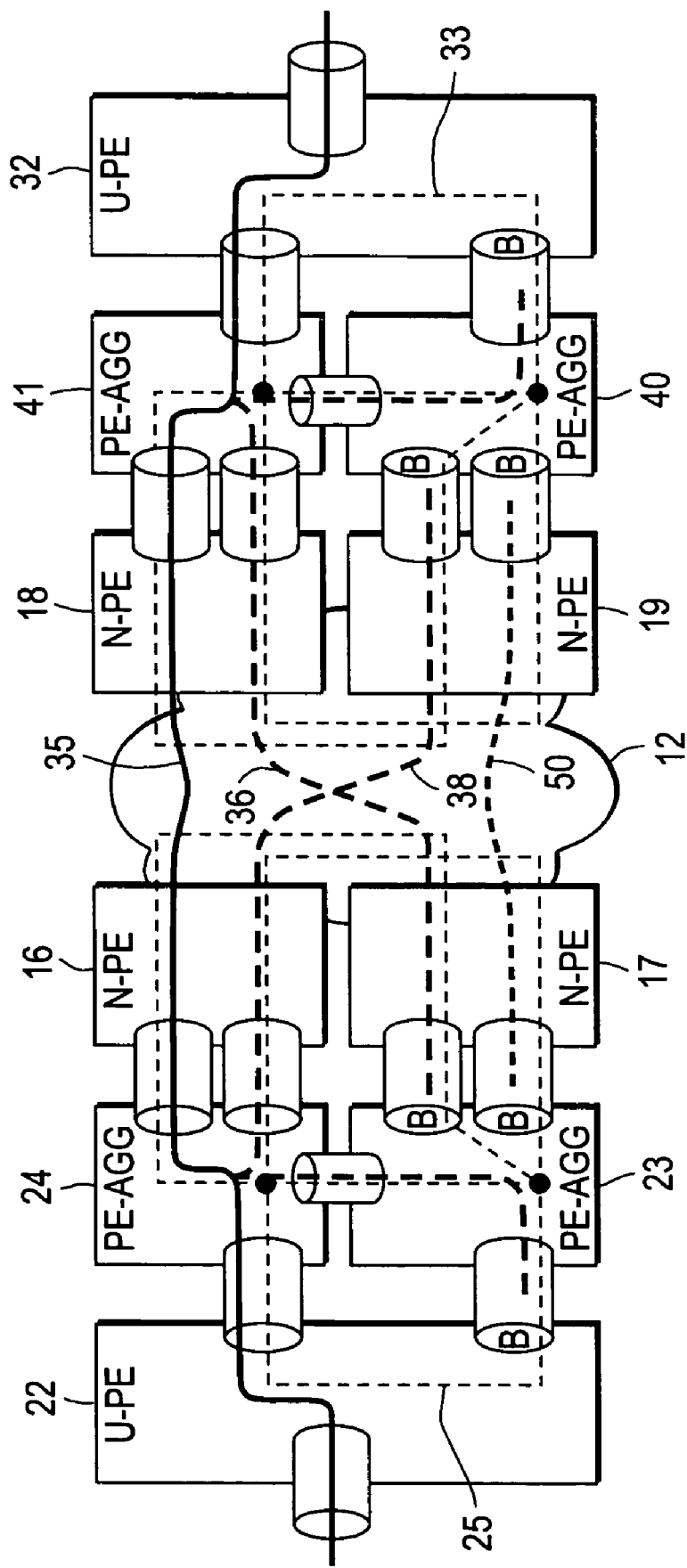
FIG. 5 shows yet another alternative embodiment of the present invention.

With reference now to FIG. 5, a network topology according to an alternative embodiment of the present invention is shown, which topology includes dual looped spanning tree protocol paths in each access domain. Note that this topology includes an additional redundant path 50 that is not flooded/learned. Path 50 is shown blocked by xSTP at the link between Agg-PE device 23 and n-PE device 17 on the left-hand side, and between Agg-PE device 40 and n-PE device 19 on the right-hand side access domain. Note further that each access domain has four links between the Agg-PE and n-PE devices. All four links can be designated as the primary one most likely to be learned based on xSTP setup. Because of the additional redundant data path, it is appreciated that the embodiment of FIG. 5 can survive a dual failure of both primary PE devices.

Figure 6:
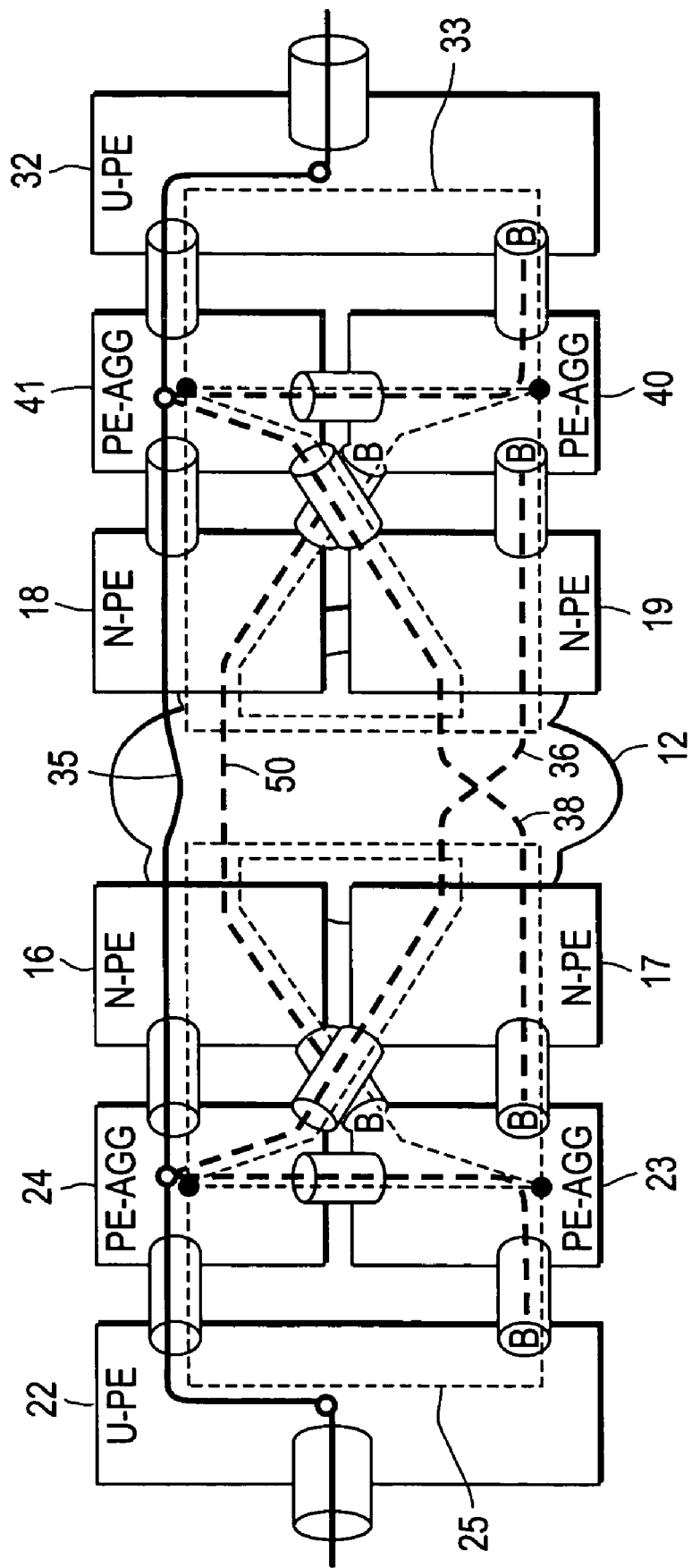
FIG. 6 illustrates still another alternative embodiment of the present invention.

FIG. 6 shows yet another with dual looped xSTP. This embodiment is similar to that shown in FIG. 4 inasmuch as two redundant pseudowires are setup between n-PE devices 17 & 19, thereby obviating the need for two physical links to each of these devices, as in the embodiment of FIG. 5. Practitioners will appreciate that the embodiment of FIG. 6 may achieve better instantaneous load balancing since the "to be blocked" flooded/multicast traffic is removed from the primary MPLS interface, i.e., along path 35.

Although the present invention has been described in conjunction with specific embodiments, numerous modifications and alterations are well within the scope of the present invention. Accordingly, the specification and drawings are to be regarded in an illustrative rather than a restrictive sense.

We claim:

1. A computer network comprising:

an Internet Protocol/Multi-protocol label switching (IP/MPLS) core network having a full mesh of pseudowires (PWs);

first and second Ethernet access domain networks connected to the IP/MPLS core network, each of Ethernet access domain networks including:

a user-facing provider edge (u-PE) device, the u-PE device running a spanning-tree protocol (STP) algorithm;

a primary network-facing provider edge (n-PE) device;

a redundant n-PE device, the u-PE device being coupled with the n-PE device and the redundant n-PE device, the primary and redundant n-PE devices not running the STP algorithm;

a primary data path for data packet traffic including a primary pseudowire (PW) connected across the IP/MPLS core network between the primary n-PE devices of the first and second Ethernet access domain networks, the primary PW being included in the full mesh, the primary data path being flooded and learned; and first and second redundant data paths that include first and second redundant Ethernet over MPLS (EoMPLS) PWs, respectively, connected across the IP/MPLS core network, the first and second redundant EoMPLS PWs being flooded and not learned, replicated Ethernet frames crossing the first and second redundant data paths being blocked by the STP algorithm at an opposite end of either the first and second Ethernet access domain networks when the primary data path is available, the STP algorithm unblocking either the first redundant data path or the second redundant data path in response to a failure of the primary data path, the failure occurring in either the first Ethernet access domain network or the second Ethernet access domain network.

2. A computer network comprising:

an Internet Protocol/Multi-protocol label switching (IP/MPLS) core network having a full mesh of pseudowires (PWs);

first and second Ethernet access domain networks connected to the IP/MPLS core network, each of Ethernet access domain networks including:

a user-facing provider edge (u-PE) device;

a primary network-facing provider edge (n-PE) device;

a redundant n-PE device;

wherein at least one of the first and second Ethernet access domains networks includes a plurality of aggregation provider edge (Agg-PE) devices providing connectivity between the u-PE device and the primary and redundant n-PE devices, the Agg-PE devices and the u-PE device running a spanning-tree protocol (STP) algorithm, the primary and redundant n-PE devices not running the STP algorithm;

a primary data path for data packet traffic including a primary pseudowire (PW) connected across the IP/MPLS core network between the primary n-PE devices of the first and second Ethernet access domain networks, the primary PW being included in the full mesh, the primary data path being flooded and learned; and first and second redundant data paths that include first and second redundant PWs, respectively, connected across the IP/MPLS core network, the first and second redundant PWs being flooded and not learned, replicated Ethernet frames crossing the first and second redundant data paths being blocked by the STP algorithm in the first Ethernet access domain network and/or the second Ethernet access domain network when the primary data path is available, the STP algorithm unblocking either the first redundant data path or the second redundant data path in response to a failure of the primary data path, the failure occurring in either the first Ethernet access domain network or the second Ethernet access domain network.

3. The computer network of claim 2 wherein the plurality of Agg-PE devices comprise a first Agg-PE device that couples the u-PE device with the primary n-PE device, and a second Agg-PE device that couples the u-PE device with the redundant n-PE device.

4. The computer network of claim 2 wherein the first redundant PW connects the redundant n-PE device of the first Ethernet access domain network with the primary n-PE device of the second Ethernet access domain network.

5. The computer network of claim 2 wherein the second redundant PW connects the redundant n-PE device of the second Ethernet access domain network with the primary n-PE device of the first Ethernet access domain network.

6. A computer network comprising:
an Internet Protocol/Multi-protocol label switching (IP/MPLS) core network having a full mesh of pseudowires (PWs);
first and second Ethernet access domain networks connected to the IP/MPLS core network, each of Ethernet access domain networks including:
a user-facing provider edge (u-PE) device;
a primary network-facing provider edge (n-PE) device;
a redundant n-PE device;
a plurality of aggregation provider edge (Agg-PE) devices providing connectivity between to the u-PE device and the primary and redundant n-PE devices, the Agg-PE devices running a spanning-tree protocol (STP) algorithm, the primary and redundant n-PE devices not running the STP algorithm;
a primary data path for data packet traffic including a primary pseudowire (PW) connected across the IP/MPLS core network between the primary n-PE devices of the first and second Ethernet access domain networks, the primary PW being included in the full mesh, the primary data oath being flooded and learned; and
first and second redundant data paths that include first and second redundant Ethernet over MPLS (EoMPLS) PWs, respectively, connected across the IP/MPLS core network, wherein the first redundant EoMPLS PW connects the redundant n-PE device of the first Ethernet access domain network with the primary n-PE device of the second Ethernet access domain network, and the second redundant EoMPLS PW connects the redundant n-PE device of the first Ethernet access domain network with the primary n-PE device of the second Ethernet access domain network, the first and second redundant EoMPLS PWs being flooded and not learned, replicated Ethernet frames crossing the first and second redundant data paths being blocked by the STP algorithm in the first Ethernet access domain network and/or the second Ethernet access domain network when the primary data path is available, the STP algorithm unblocking either the first redundant data path or the second redundant data path in response to a failure of the primary data path, the failure occurring in either the first Ethernet access domain network or the second Ethernet access domain network.

7. The computer network of claim 6 wherein the plurality of Agg-PE devices comprise Ethernet bridges.

8. The computer network of claim 6 wherein the plurality of Agg-PE devices comprise a first Agg-PE device that couples the u-PE device with the primary n-PE device, and a second Agg-PE device that couples the u-PE device with the redundant n-PE device.

9. A computer network comprising:
an Internet Protocol/Multi-protocol label switching (IP/MPLS) core network having a full mesh of pseudowires (PWs);
first and second Ethernet access domain networks connected to the IP/MPLS core network, each of Ethernet access domain networks including:
a user-facing provider edge (u-PE) device;
a primary network-facing provider edge (n-PE) device;
a redundant n-PE device;
a first aggregation provider edge (Agg-PE) device that couples the u-PE device with the primary n-PE device, and
a second Agg-PE device that couples the u-PE device with the redundant n-PE device, the first and second Agg-PE devices running a spanning-tree protocol (STP) algorithm, the primary and redundant n-PE devices not running the STP algorithm;
a primary data path for data packet traffic including a primary pseudowire (PW) connected across the core network between the primary n-PE devices of the first and second Ethernet access domain networks, the primary PW being included in the full mesh, the primary data oath being flooded and learned; and
first and second redundant data paths that include first and second redundant Ethernet over MPLS (EoMPLS) PWs, respectively, connected across the IP/MPLS core network between the redundant n-PE devices of the first and second Ethernet access domain networks, the first and second redundant EoMPLS PWs being flooded and not learned, replicated Ethernet frames crossing the first and second redundant data paths being blocked by the STP algorithm in the first Ethernet access domain network and/or the second Ethernet access domain network when the primary data path is available, the STP algorithm unblocking either the first redundant data path or the second redundant data path in response to a failure of the primary data path, the failure is occurring in either the first Ethernet access domain network or the second Ethernet access domain network.

10. The computer network of claim 9 wherein the first and second Agg-PE devices comprise Ethernet bridges.

11. A computer network comprising:
an Internet Protocol/Multi-protocol label switching (IP/MPLS) core network having a full mesh of pseudowires (PWs);
first and second Ethernet access domain networks connected to the IP/MPLS core network, each of Ethernet access domain networks including:
a user-facing provider edge (u-PE) device;
a primary network-facing provider edge (n-PE) device;
a redundant n-PE device;
a first aggregation provider edge (Agg-PE) device that couples the u-PE device with the primary n-PE device, and
a second Agg-PE device that couples the u-PE device with the redundant n-PE device, the first and second Agg-PE devices running a spanning-tree protocol (STP) algorithm, the primary and redundant n-PE devices not running the STP algorithm;
a primary data path for data packet traffic including a primary pseudowire (PW) connected across the core network between the primary n-PE devices of the first and second Ethernet access domain networks, the primary PW being included in the full mesh, the primary data path being flooded and learned; and first and second redundant data paths that include first and second redundant PWs, respectively, connected across the IP/MPLS core network between the redundant n-PE devices of the first and second Ethernet access domain networks, the first redundant data path including a link between the first Agg-PE and the redundant n-PE device of the first Ethernet access domain network, and the second redundant data path including a link between the first Agg-PE and the redundant n-PE device of the second Ethernet access domain network, the first and second redundant PWs being flooded and not learned, replicated Ethernet frames crossing the first and second redundant data paths being blocked by the STP algorithm when the primary data path is available, the STP algorithm unblocking either the first or second redundant data path in response to a failure of the primary data path, the failure occurring in either the first Ethernet access domain network or the second Ethernet access domain network.

12. The computer network of claim 11 wherein the first and second Agg-PE devices comprise Ethernet bridges.

\* \* \* \* \*

UNITED STATES PATENT AND TRADEMARK OFFICE
CERTIFICATE OF CORRECTION

PATENT NO. : 7,643,409 B2  Page 1 of 1
APPLICATION NO. : 10/925743
DATED : January 5, 2010
INVENTOR(S) : Voit et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1276 days.

Signed and Sealed this

Twenty-first Day of December, 2010

David J. Kappos
*Director of the United States Patent and Trademark Office*